United States Patent [19]

Schulz et al.

[11] 3,863,495

[45] Feb. 4, 1975

[54] QUARTZ CRYSTAL SOLUTE MASS DETECTOR

[75] Inventors: Wolfgang W. Schulz, Warren; William H. King, Jr., Florham Park, both of N.J.

[73] Assignee: Exxon Research and Engineering Company, Linden, N.J.

[22] Filed: Apr. 16, 1973

[21] Appl. No.: 351,339

[52] U.S. Cl............................................. 73/61.1 C
[51] Int. Cl............................................. G01n 5/04
[58] Field of Search........... 73/61.1 C, 23, 28, 15 R, 73/432 R

[56] References Cited
UNITED STATES PATENTS

| | | | |
|---|---|---|---|
| 3,164,004 | 1/1965 | King, Jr. | 73/23 |
| 3,260,104 | 7/1966 | King, Jr. | 73/23 |
| 3,266,291 | 8/1966 | King, Jr. | 73/23 |
| 3,327,519 | 6/1967 | Crawford | 73/23 |
| 3,329,004 | 7/1967 | King, Jr. | 73/23 |
| 3,561,253 | 2/1971 | Dorman | 73/28 |
| 3,653,253 | 4/1972 | Olin | 73/28 |
| 3,677,066 | 7/1972 | King, Jr., et al. | 73/23 |

*Primary Examiner*—Richard C. Queisser
*Assistant Examiner*—Joseph W. Roskos
*Attorney, Agent, or Firm*—Harold N. Wells

[57] ABSTRACT

A method and apparatus for detection of the mass of materials partitioned in a liquid chromatographic column by sampling a portion of the column effluent (eluate) and weighing the sample on a quartz crystal microbalance is disclosed. The solvent carrier is evaporated from the sample deposited on the crystal and its vibrational frequency measured. The change in frequency is proportional to the mass of material which remains after the solvent has been evaporated. Counting and recording equipment provide for continuous measurement and recording of the mass eluting from the chromatographic column.

10 Claims, 3 Drawing Figures

3,863,495

QUARTZ CRYSTAL SOLUTE MASS DETECTOR

BACKGROUND OF THE INVENTION

Application U.S. Ser. No. 298,956, assigned to the same assignee as the present application, discloses a method and apparatus for determining the molecular weight distribution of a polymer by gel permeation chromatography, and includes measurement of mass directly by a crystal microbalance.

PRIOR ART

Liquid-liquid chromatography (LLC) provides a method of separating a number of materials and is becoming widely used, particularly for separating substances of low volatility. The separated materials as they are eluted from the chromatographic column are detected and measured to enable one to determine the composition of the sample introduced to the chromatograph. A number of detectors have been utilized, including the differential refractrometer, the ultraviolet absorption detector and the flame ionization detector. Other detectors which measure more specific properties include conductance, fluorescence, heat of adsorption and others. The general field of LLC detectors has been reviewed in several articles. In particular, attention is drawn to Zweig, G. Anal. Chem. 44, 47 R. (1972). None of these detectors measure mass directly or a property related to only mass. Often, however, mass is the property which is really wanted. In copending U.S. application Ser. No. 298,956, which will be assigned to the same assignee as the present application, the use of a mass detector for gel permeation chromatography (GPC) is disclosed in brief. The subject of the present application relates to the method and apparatus for applying such a mass detector to a chromatographic device, in particular a LLC or GPC chromatograph.

The operative principles of the quartz crystal microbalance need not be discussed in extensive detail, reference made to Research/Development, April and May 1969, Volume 20, Nos. 4 and 5, pages 28-34 and 28-33 for further details thereof. Also, see copending patent application U.S. Ser. No. 250,086, assigned to the same assignee as this application, for further details of a specific application. The general use of the quartz crystal as a microbalance has been disclosed in many U.S. patents and notably U.S. Pat. No. 3,164,004, where it is applied in a different manner than here. There are two basic modes in which the crystal microbalance is employed. Most applications of the crystal microbalance have used a predeposited substrate on the crystal to absorb the material to be analyzed. Thus, the weight gain is measured by determining the amount of material absorbed. In the present technique, as well as in U.S. Pat. application Ser. No. 250,086, a mixture of the material to be analyzed and a solvent is deposited on the crystal which has not been precoated, the solvent is evaporated and the material which remains behind on the crystal is measured directly.

In a chromatographic process a sample of the material to be analyzed is introduced into a carrier stream and passed into a chromatographic column where a mixture of materials may be separated depending upon their partition or absorptive characteristics. Once deposited, the materials are removed by the process of elution which, by the passing of a clean stripping fluid into the chromatographic column, has the effect of removing the separated materials according to their physical characteristics. They come out of the column in sequence rather than mixed as they were when introduced into the column. Since the material to be analyzed is now in sequence, if the column effluent (eluate) is sampled periodically and the mass measured, a determination may be made of the amount of material having physical properties of interest which are measured separately.

In LLC or GPC, the period over which analysis must be made extends to the order of minutes up to several hours. In order to properly characterize the eluate material, in a typical GPC, for which elution times are relatively long, it is preferred to take samples every 10-60 seconds. Of course, the more rapid and frequent the sampling, the more accurate the results. Mass determination must be made on an accurately defined sample quantity, the sample disposed of, and the equipment returned to its initial condition ready to receive another sample, all within a very brief period. Thus, in order to make mass measurements, all these operations must be carried out repetitively and within rigid time constraints. For the crystal microbalance to meet these requirements is difficult, for it requires the separation of the solvent material from the material to be measured. Thus, an accurately measured sample must be taken, deposited upon a vibrating crystal, the solvent evaporated, the crystal frequency measured in comparison to the reference frequency, and the crystal made ready for a new sample, all within a relatively short period of time. It is believed that the present invention satisfies the foregoing objectives and overcomes the deficiencies of existing techniques.

SUMMARY OF THE INVENTION

An accurately reproducible volume of liquid eluting from a liquid-liquid chromatograph (LLC) or a gel permeation chromatograph (GPC) is deposited at predetermined time intervals on the surface of the quartz crystal microbalance, thereby assuring that the original material, which was separated in the column, can be determined by its representative fractions. The solvent can be evaporated naturally or with the assistance of a stream of heated gas or an automatically heated crystal. The mass of the residual material remaining on the crystal after evaporation of the solvent is determined by the change in the vibrating or resonant frequency of the quartz crystal as compared with the resonant frequency of a reference crystal on which nothing has been deposited.

The amount of eluting material deposited is determined by means of an adjustable spray gun under the control of a master program timer which controls the repetitive sequential process. The program timer also operates to admit heated gas over the quartz crystal to assist in evaporating the solvent. The difference between vibrational frequency of the two crystals is measured by a standard differential frequency meter operating from the oscillator circuits associated with the paired crystals. The output of the differential frequency meter may be converted directly to differential mass and recorded.

Several modes of operation are possible which will insure satisfactory sampling of the eluate from the chromatographic column. In the preferred embodiment, the eluate is passed through small bore tubing to a point immediately adjacent to the outlet of the spray nozzle which is normally blocked by a needle in the nozzle. In the absence of spraying, the entire sample stream overflows from the nozzle, but when the spray nozzle is actuated, the needle in the spray nozzle is opened momentarily and a predetermined portion of the eluate is sprayed onto the sampling crystal. The needle then closes and the eluate continues to overflow as before.

DESCRIPTION OF THE PREFERRED EMBODIMENT

Figure 1:
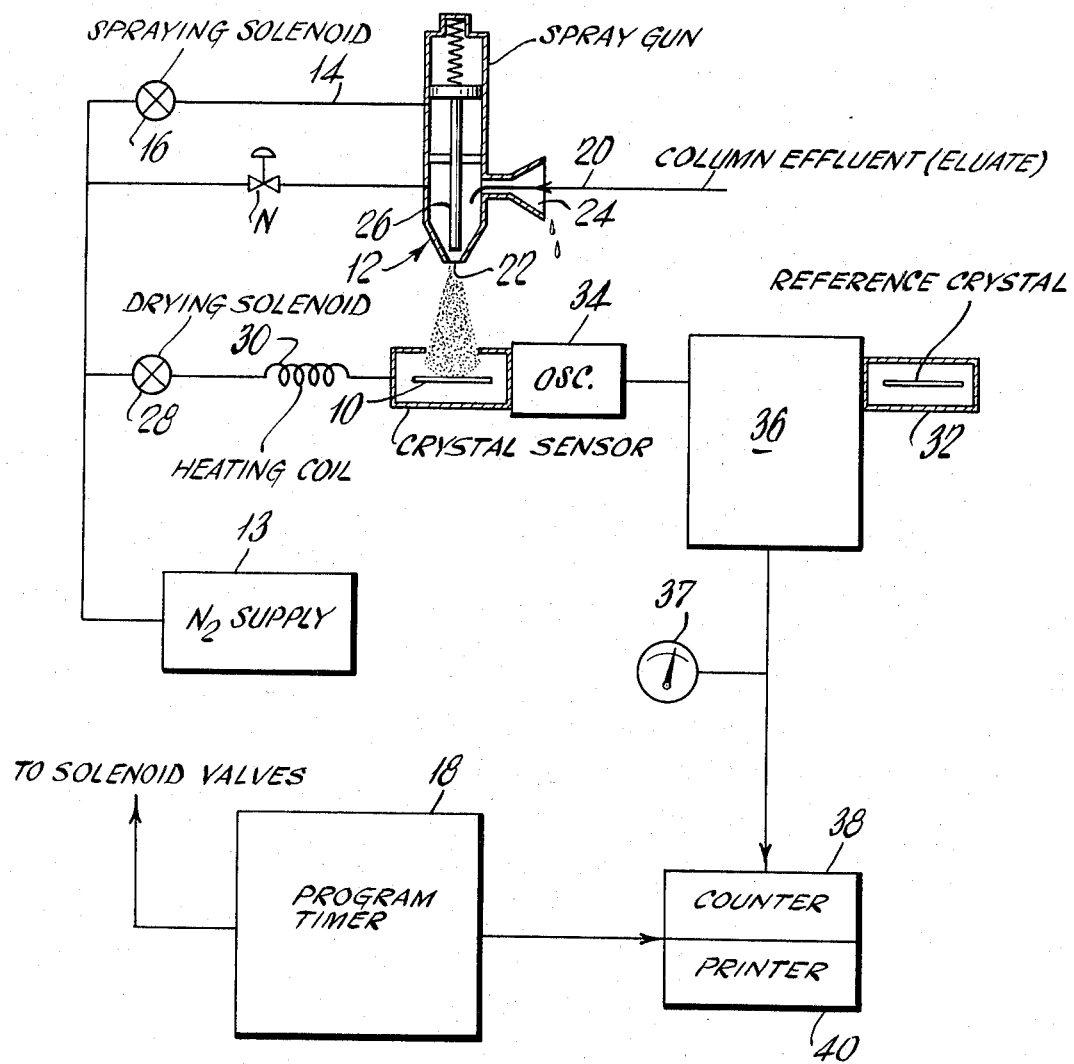
FIG. 1 illustrates schematically the overall arrangement of the apparatus according to the present invention.

In FIG. 1 a detector crystal 10 receives a periodic spray from spray gun 12, typically a highly precise industrial spray gun, which is actuated by means of nitrogen entering through tube 14 under the control of the solenoid 16, which is in turn operated by the program timer 18. The eluate from the chromatograph passes through a small diameter tubing 20 into the spray gun 12 terminating near the outlet nozzle 22, which is normally closed by needle valve 26. When the nozzle 22 is closed, liquid builds up with the lower or outlet chamber of the gun and overflows through tubing 20 into a measuring device (not shown), which may be the syphon of the related application. When the program timer 18 actuates solenoid 16, nitrogen passes from supply 13 through line 14 and is admitted to the spray nozzle which opens the needle valve 26 and for a predetermined period an exceedingly fine spray is deposited upon the detector crystal 10. The amount deposited is determined by the cycle timer 18 or program timer, depending upon the concentration of the solid material in the eluate. A liquid affects a crystal differently than solids deposited on it. Not only is the resonant frequency changed, but the damping effect of the liquid changes the amplitude of the vibration. This change in amplitude is used to measure the amount of spray when adjusting the spray gun so that the desired amount of eluate is deposited at each cycle.

Figure 2:
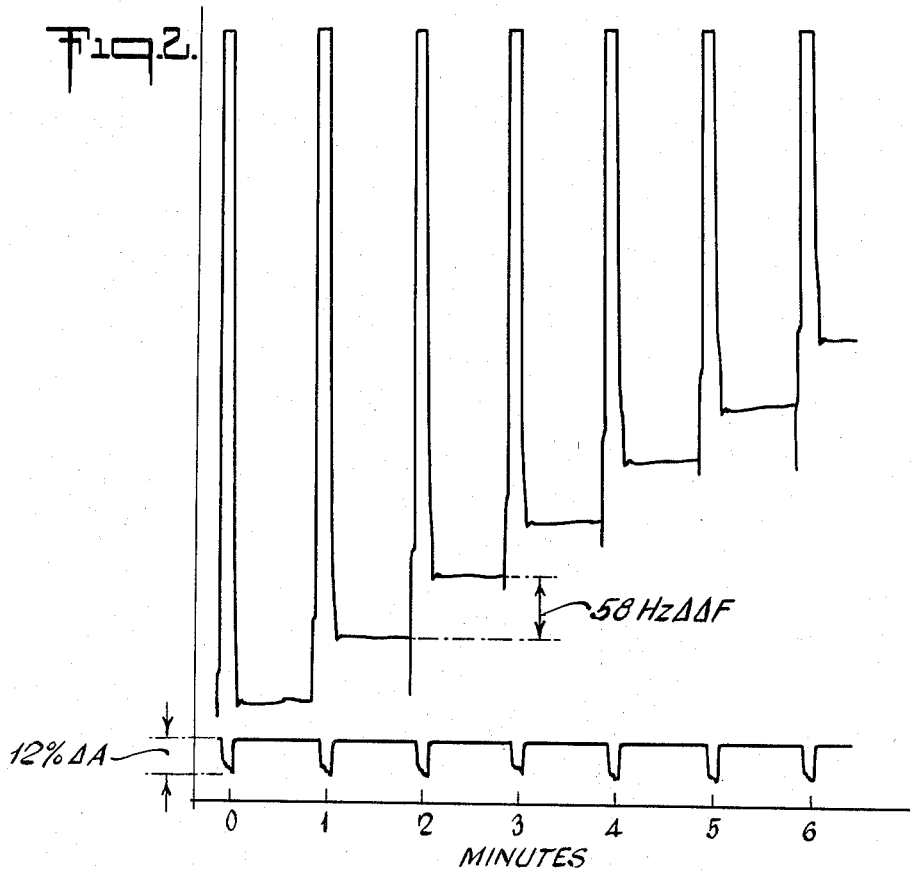
FIG. 2 illustrates graphically the relative changes in frequency of the sampling crystal with successive deposition of portions of a dilute polymer solution.

Once the liquid has been sprayed on the detector crystal, the resonant frequency (frequency of vibration) is shifted proportionally to the amount of material deposited (see FIG. 2). The program timer 18 opens solenoid valve 28, admitting nitrogen through the heating coil 30 so that it passes over the detector crystal 10, supplying heat for rapid evaporation of the solvent and at the same time stabilizing the operation of the crystal, which is somewhat sensitive to temperature of its operation. Alternatively, a heated crystal can be used to assist in stabilization of the crystal temperature. Such a crystal is disclosed in U.S. Pat. No. 3,478,573. The frequency of the vibrating crystal rapidly returns toward, but never approaches, its normal resonant frequency since solids remain behind as the solvent evaporates. This change in mass of the crystal is measured, either as a change in frequency of the crystal receiving the sample, or as a differential frequency when referred to the resonant frequency of a sealed crystal 32 (FIG. 1).

In the preferred technique, the crystal is not cleaned between sprayings. Once the frequency has stabilized, an additional spraying is made directly upon the previously deposited material. Thus, the sample is continuously built up over the period during which a sample elutes from the chromatograph. FIG. 2 illustrates the process, but as applied with a uniform solution (the eluate will be nonuniform). The application of a portion of the solution by spray gun 12 is marked by a large change in frequency which is quickly reduced as the solvent is evaporated. The offset represents solids remaining on the crystal and is the mass representative of the sample. The change in amplitude of the vibration is also shown, which is used to adjust the amount of sample deposited.

In addition to the preferred spraying technique, others are possible. Liquid may be flowed directly over the detector crystal or the crystal could be dipped in the liquid and withdrawn. Instead of simply overflowing from the spray nozzle, it is also possible to apply an automatic sampling valve to periodically grab a sample from the eluate stream which would be sprayed onto the crystal.

More complex systems also may be used when a faster measurement is needed. For example, a multiplicity of crystals rotating in sequence through the operation can be used. A washing step could be added to clean the crystal after each deposition, thus returning it to its initial position. But for many purposes, the build up on a single crystal is satisfactory since a complete cycle may be made with a period as low as 10 seconds.

Measurement of the frequency of each crystal is made by means of conventional oscillator circuits 34 operatively connected therewith and the differential frequency is measured and recorded by the computer 36 which calculates differential frequency and amplitude from the oscillator outputs. A counter 38 is used to control the program timer 18 to coordinate and adjust the operation. Printer 40 records the output of the mass analyzed and differential amplitude meter 37 provides a means for checking the amount of sample deposited by the spray gun.

Figure 3:
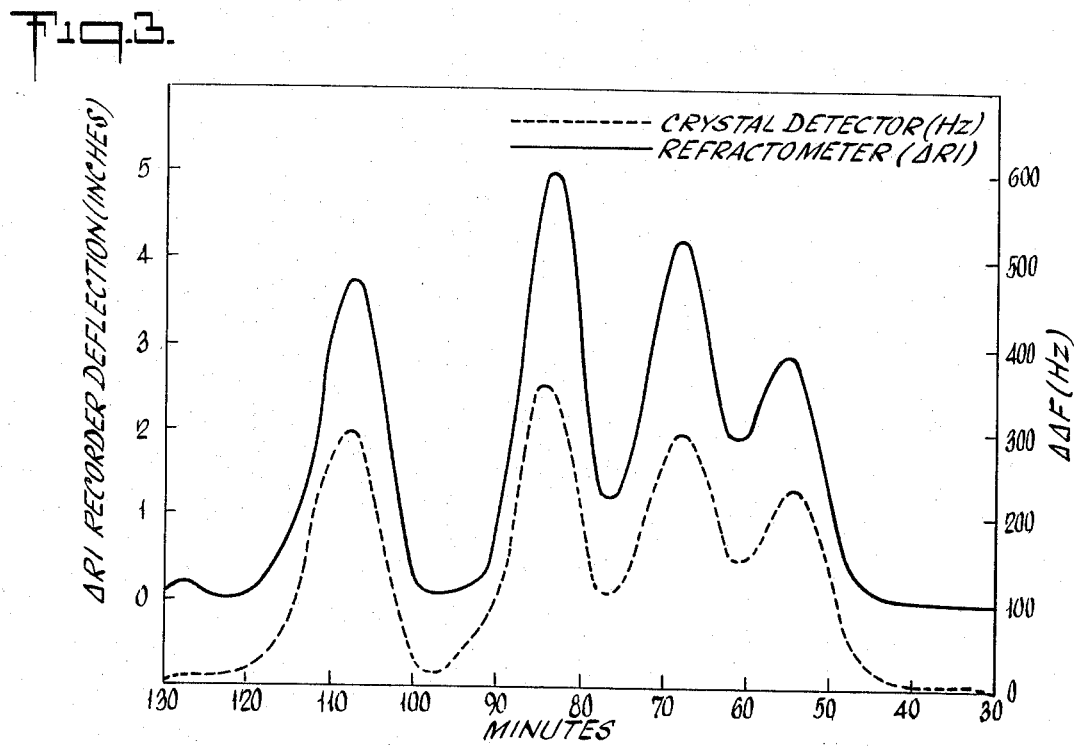
FIG. 3 compares the performance of a typical refractometer measuring the eluate from a gel permeation chromatograph with the output of the apparatus of FIG. 1.

In FIG. 3 a comparison is made of the performance of a refractometer, such as is commonly used in a gel permeation chromatograph, with the quartz crystal mass detector which is disclosed herein. Since this comparison was made using a standard polymer mixture, the result may be quite accurately known and the correlation of the crystal mass detector with the refractometer is shown to be remarkably good.

Although disclosed with reference to its use with a chromatographic column, the apparatus could be adopted to many systems in which measurement of the mass of dissolved solids is desired. For example, on-line process analyzers for measurement of solids contents in flowing solutions.

The foregoing description of the preferred embodiments is intended to be illustrative of the invention and should not be considered to limit the scope thereof as set forth in the claims which follow.

What is claimed is:

1. A method of measuring the mass of materials which have been separated in a liquid-liquid chromatographic column and subsequently eluted in a sequential manner by a carrier solvent according to their physical characteristics as an eluate stream comprising the following steps in combination:
  a. sampling an accurately reproducible amount of said eluate stream at uniform intervals during the elution of said materials, whereby the samples are representative of the separated material in said column;
  b. depositing each of said eluate samples on a first crystal;
  c. rapidly evaporating the carrier solvent from each of said eluate samples; and
  d. measuring the resonant frequency of said first crystal after said carrier solvent has been evaporated from each sample.

2. The method of claim 1 further comprising the steps of:
  e. comparing the frequency measured in (d) with a reference frequency;
  f. determining the difference between the resonant frequency of said first crystal and said reference frequency;
  g. determining the mass of the solids deposited on said first crystal by each eluate sample by means of a predetermined correlation between change of vibrational frequency and mass; and
  h. repeating the steps (a) through (g) until all of the separated material has eluted from the column.

3. The method of claim 1 wherein the sample is deposited on said first crystal by spraying.

4. The method of claim 3 wherein the amount of sample sprayed onto said first crystal is determined by the amount which the amplitude of vibration of said crystal is damped.

5. An apparatus for measuring the mass of materials which have been separated in a liquid-liquid chromatographic column and subsequently eluted by a carrier solvent in a sequential manner according to their physical characteristics as an eluate stream comprising:
  a. a first crystal adapted to receive a sample of the eluate;
  b. a first oscillator operably connected to said first crystal for measuring the resonant frequency thereof;
  c. a second reference crystal;
  d. a second oscillator operably connected to said second crystal for measuring the reference frequency thereof;
  e. means for depositing an accurately reproducible sample of said eluate on said first crystal at uniform intervals during the elution of said materials, whereby the samples are representative of the separated material in said column;
  f. means for comparing the resonant and reference frequencies of said first and second crystals;
  g. controller means for periodically activating said depositing means.

6. The apparatus of claim 5 wherein said depositing means is an adjustable spraying means characterized by its ability to deliver an accurately reproducible amount of spray each time it is actuated.

7. The apparatus of claim 6 wherein said spraying means is a spray gun operated by gaseous nitrogen under pressure and admitted to said spray gun by actuation of a valve by said controller means.

8. The apparatus of claim 7 wherein said eluate stream upon leaving said column passes through a tubing passageway connected to said spray gun near the outlet nozzle thereof and thereafter exits said nozzle through a tubing passageway to a measuring device.

9. The apparatus of claim 5 wherein nitrogen under pressure is admitted over said first crystal to assist evaporation of said carrier solvent by actuation of a valve by said controller means.

10. The apparatus of claim 9 wherein a heater is connected between said nitrogen valve and said first crystal whereby said nitrogen is warmed before reaching said crystal to speed the removal of said carrier solvent.

* * * * *